United States Patent
Majima

(10) Patent No.: US 9,523,337 B2
(45) Date of Patent: Dec. 20, 2016

(54) IDLING STOP CONTROL DEVICE

(71) Applicant: Toyota Jidosha Kabushiki Kaisha, Toyota-shi Aichi-ken (JP)

(72) Inventor: Hiroshi Majima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/967,908

(22) Filed: Dec. 14, 2015

(65) Prior Publication Data

US 2016/0237975 A1 Aug. 18, 2016

(30) Foreign Application Priority Data

Feb. 12, 2015 (JP) ................................ 2015-025191

(51) Int. Cl.
*G06F 19/00* (2011.01)
*F02N 11/08* (2006.01)

(52) U.S. Cl.
CPC ................................ *F02N 11/0833* (2013.01)

(58) Field of Classification Search
CPC ....... F02N 11/08; F02N 11/00; F02N 11/0818; F02D 2009/0245
USPC ........... 701/101, 112, 113; 123/179.1, 179.4, 123/179.23; 180/65.1, 65.22
See application file for complete search history.

(56) References Cited

U.S. PATENT DOCUMENTS

| | | | | |
|---|---|---|---|---|
| 2010/0312460 A1* | 12/2010 | Yamaguchi | ......... | F02N 11/0833 701/112 |
| 2014/0067241 A1* | 3/2014 | Yuhara | .................... | F02D 45/00 701/112 |
| 2014/0365099 A1* | 12/2014 | Tochigi | .................... | F02D 17/04 701/99 |
| 2015/0259008 A1* | 9/2015 | Seguchi | ............... | B62D 15/025 701/41 |
| 2016/0076472 A1* | 3/2016 | Nakamoto | ................ | F02B 1/12 123/299 |
| 2016/0251017 A1* | 9/2016 | Majima | ............... | B60W 30/192 |

FOREIGN PATENT DOCUMENTS

| | | |
|---|---|---|
| JP | 2008-285124 A | 11/2008 |
| JP | 2008-289229 A | 11/2008 |
| JP | 2009-132325 A | 6/2009 |
| JP | 2010-091496 A | 4/2010 |
| JP | 2012-076513 A | 4/2012 |
| JP | 2014-185557 A | 10/2014 |

* cited by examiner

*Primary Examiner* — John Kwon
(74) *Attorney, Agent, or Firm* — Dinsmore & Shohl LLP

(57) ABSTRACT

An idling stop control device of the invention acquires an index (SOCx) indicating a magnitude of a remaining charged electric power amount of a battery (41), restarts an operation of an engine (25) by operating a starter (43) when the index becomes smaller than a predetermined restart threshold (SOCstart) while an automatic stop of the operation of the engine has been carried out, and changes the threshold from a first threshold (SOC1) to a second threshold (SOC2) when an operation of an electric actuator (31) is started while the automatic stop has been carried out. The first threshold is a threshold set immediately before the operation of the actuator is started and the second threshold is smaller than the first threshold.

5 Claims, 10 Drawing Sheets

IDLING STOP CONTROL DEVICE

BACKGROUND OF THE INVENTION

Field of the Invention

The present invention relates to an idling stop control device for automatically stopping an operation of an internal combustion engine temporarily to save a fuel and reduce an amount of an exhaust gas.

Description of the Related Art

Conventionally, there is known a vehicle incorporating an idling stop control device for executing an idling stop control. In general, the idling stop control device automatically stops the operation of the engine when a stop of the vehicle is detected on the basis of a vehicle speed, a brake operation and the like and the idling stop control device restarts the operation of the engine when an action for starting the travel of the vehicle is detected on the basis of a release of a brake pedal or the like. Further, there is known an idling stop control for automatically stopping the operation of the engine while the vehicle is stopping as well as while the vehicle is travelling. For example, according to this idling stop control, the operation of the engine is automatically stopped when the brake pedal is depressed to decelerate the vehicle.

When the operation of the engine has been automatically stopped by the idling stop control, an electric generation by an alternator has been stopped and thus, an electric power is supplied to vehicle electric loads only from a battery. When the brake pedal is released and thus, a condition for permitting the idling stop is not satisfied, the starter receives an electric power from the battery to restart the operation of the engine.

For example, in a device described in JP 2010-91496 A, a condition that a remaining charged electric power amount of the battery is equal to or larger than a reference value is set as one of conditions for permitting the idling stop so as to surely restart the operation of the engine.

SUMMARY OF THE INVENTION

There is known an electric actuator for changing a vehicle motion state while the vehicle is travelling as one of the vehicle electric loads. When the operation of the engine has been automatically stopped while the vehicle is travelling by the idling stop control, the electric actuator is supplied with an electric power from the battery. There is an electric active stabilizer as one of the electric actuators. The electric active stabilizer drives an electric motor to change a torsional stiffness of a stabilizer bar for achieving a target roll angle. Although the electric active stabilizer operates temporarily, for example, while the vehicle is turning, an amount of an electric power consumed by the operation of the electric active stabilizer is large and thus, the decrease of the remaining charged electric power amount of the battery is large.

Thus, when the electric active stabilizer operates while the automatic stop of the operation of the engine has been carried out by the idling stop control, the remaining charged electric power amount of the battery may decrease below a reference value while the electric active stabilizer is being operated. When the idling stop control device described in JP 2010-91496 A detects that the remaining charged electric power amount of the battery decreases below the reference value, the idling stop control device activates the starter to restart the operation of the engine. At this time, the amount of the electric power supplied to the electric active stabilizer changes due to the activation of the starter and thus, a roll motion state of the vehicle changes in an undesirable manner. Thus, a driver may feel a discomfort.

Such a problem occurs in the electric active stabilizer as well as the other electric actuator for changing the motion state of the vehicle. In other words, in general, an amount of an electric power consumed by the electric actuator for changing the motion state of the vehicle is large and thus, the starter may be activated at a relatively high frequency under the state described above in the idling stop control. As a result, the motion state of the vehicle considerably changes and thus, the driver may feel a discomfort.

The present invention is made for solving such a problem. One of objects of the present invention is to prevent an automatic restart of the engine by the idling stop control while the electric actuator has been operated as possible.

In order to achieve the object described above, an idling stop control device according to the present invention is applied to a vehicle, comprising:

an internal combustion engine (25);

a vehicle electric power source (40) including a generator (42) for generating an electric power by an output of the engine (25) and a battery (41) charged by the generator (42);

a starter (43) for starting an operation of the engine (25) by an electric power supplied from the battery (41); and an electric actuator (31) for changing a motion state of the vehicle by an electric power supplied from the vehicle electric power source (40) while the vehicle is travelling.

The idling stop control device according to the present invention comprises an electronic control unit (10) programmed to execute an idling stop control for automatically stopping and restarting the operation of the engine (25) on the basis of a predetermined idling stop condition while the vehicle is travelling.

The electronic control unit (10) is programmed:

to acquire a remaining charged electric power amount index (SOCx) indicating a magnitude of a remaining charged electric power amount (SOC) of the battery (41);

to restart the operation of the engine (25) by operating the starter (43) when the remaining charged electric power amount index (SOCx) becomes smaller than a predetermined restarting threshold (SOCstart) while the automatic stop of the operation of the engine (25) has been carried out by the idling stop control; and to change the restart threshold (SOCstart) from a first threshold (SOC1) to a second threshold (SOC2) when the operation of the electric actuator (31) is started while the automatic stop of the operation of the engine (25) has been carried out by the idling stop control, the first threshold (SOC1) being a threshold set immediately before the operation of the electric actuator (31) is started and the second threshold (SOC2) being smaller than the first threshold (SOC1).

As described above, the idling stop control device according to the present invention is applied to the vehicle comprising the engine (25), the vehicle electric power source (40), the starter (43) and the electric actuator (31). The idling stop control device according to the present invention comprises an electronic control unit (10) programmed to execute the idling stop control for automatically stopping and restarting the operation of the engine (25) on the basis of the predetermined idling stop condition while the vehicle is travelling. The vehicle electric power source (40) includes the electric generator (42) for generating an electric power by the operation of the engine (25) and the battery (41) charged by the generator (42). The starter (43) starts the operation of the engine (25) by an electric power supplied from the battery (41). The electric actuator (31) is supplied with an electric power from the vehicle electric power source (40) to change the motion state of the vehicle while the vehicle is travelling. The idling stop control device according to the present invention comprises the electronic control unit (10) programmed to execute the idling stop control for automatically stopping and restarting the operation of the engine (25) on the basis of predetermined idling stop conditions while the vehicle is travelling.

The electronic control unit (10) is programmed to acquire the remaining charged electric power amount index (SOCx) indicating the magnitude of the remaining charged electric power amount of the battery (41). For example, the remaining charged electric power amount index (SOCx) may be a SOC value (State Of Charge value) indicating a ratio of the remaining charged electric power amount to a full electric power amount of the battery (41).

The electronic control unit (10) is programmed to restart the operation of the engine (25) by operating the starter (43) when the remaining charged electric power amount index (SOCx) becomes smaller than the restart threshold (SOCstart) while the automatic stop of the operation of the engine (25) has been carried out by the idling stop control.

When the electric actuator (31) is operated while the automatic stop of the operation of the engine (25) has been carried out, the remaining charged electric power amount of the battery (41) is likely to decrease below the restart threshold (SOCstart) while the electric actuator (31) has been operated. When the remaining charged electric power amount index (SOCx) of the battery (41) decreases below the restart threshold (SOCstart), the operation of the starter (43) is started. At this time, the amount of the electric power supplied to the electric actuator (31) changes. As a result, the motion state of the vehicle changes in an undesirable manner and thus, the driver may feel a discomfort. Accordingly, the electric control unit (10) is programmed to change the restart threshold (SOCstart) from a first threshold (SOC1) to a second threshold (SOC2) when the operation of the electric actuator (31) is started while the automatic stop of the operation of the engine (25) has been carried out by the idling stop control, the first threshold (SOC1) is a threshold immediately before the operation of the electric actuator (31) is started and the second threshold (SOC2) is smaller than the first threshold (SOC1).

Thereby, it is possible to reduce a possibility that the operation of the engine (25) is automatically restarted by the idling stop control while the electric actuator (31) has been operated. As a result, the motion state of the vehicle can be stably controlled and an occurrence of an uncomfortable feeling in the driver can be suppressed as possible.

According to one aspect of the present invention, the electronic control unit (10) may be programmed to return the restart threshold (SOCstart) from the second threshold (SOC2) to the first threshold (SOC1) when the operation of the electric actuator (31) is ended after the restart threshold (SOCstart) is changed to the second threshold (SOC2).

According to this aspect of the present invention, the restart threshold (SOCstart) is returned from the second threshold (SOC2) to the first threshold (SOC1) when the operation of the electric actuator (31) is ended while the automatic stop of the operation of the engine (25) has been carried out by the idling stop control. Therefore, while the remaining charged electric power amount index (SOCx) has not decreased below the second threshold (SOC2) while the electric actuator (31) has been operated, the operation of the engine (25) is maintained at a stop state, that is, the starter (43) is not operated if the other idling stop condition is satisfied. Thus, the motion state of the vehicle can be appropriately changed. Thereby, an occurrence of an uncomfortable feeling in the driver can be suppressed as possible.

In addition, when the operation of the electric actuator (31) is ended, the restart threshold (SOCstart) is returned to the first threshold (SOC1). Thus, the restart threshold (SOCstart) can be appropriately switched. For example, in case that the remaining charged electric power amount index (SOCstart) decreases below the first threshold (SOC1) when the operation of the electric actuator (31) is ended, the operation of the starter (43) is started to restart the operation of the engine (25) at the ending of the operation of the electric actuator (31).

According to another aspect of the present invention, the electronic control unit (10) may be programmed:
to maintain the restart threshold (SOCstart) at the second threshold (SOC2) until the predetermined constant time (Tref) elapses after the restart threshold (SOCstart) is changed to the second threshold (SOC2); and
to return the restart threshold (SOCstart) to the first threshold (SOC1) when the constant time (Tref) elapses.

According to this aspect of the present invention, when the operation of the electric actuator (31) is started while the automatic stop of the operation of the engine (25) has been carried out by the idling stop control, the restart threshold (SOCstart) is changed from the first threshold (SOC1) to the second threshold (SOC2) and after the constant time (Tref) elapses from the change of the restart threshold (SOCstart) to the second threshold (SOC2), the restart threshold (SOCstart) is returned to the first threshold (SOC1). For example, it is preferred that the constant time (Tref) is set on the basis of one expected operation time of the electric actuator (31). Thereby, in a normal operation of the electric actuator (31), there can be suppressed the returning of the restart threshold (SOCstart) from the second threshold (SOC2) to the first threshold (SOC1) while the electric actuator (31) has been operated. Therefore, during that period, the motion state of the vehicle can be appropriately changed and an occurrence of an uncomfortable feeling in the driver can be suppressed as possible.

According to another aspect of the present invention, the electric actuator may be an electric active stabilizer (31) for changing a torsional stiffness of a stabilizer bar (32R, 32L) by driving an electric motor (331).

According to this aspect of the present invention, when the electric active stabilizer (31) is operated while the automatic stop of the engine (25) has been carried out by the idling stop control, the restart threshold (SOCstart) is changed from the first threshold (SOC1) to the second threshold (SOC2). Thus, it is possible to reduce a possibility that the automatic restarting of the operation of the engine (25) is carried out while the electric active stabilizer (31) has been operated. As a result, it is possible to reduce a possibility that the roll motion state of the vehicle changes in an undesirable manner and an occurrence of an uncomfortable feeling in the driver can be suppressed as possible. Further, one operation time of the electric active stabilizer (31) is short. Thus, the second threshold (SOC2) can be set such that the remaining charged electric power amount of the battery (41) is not considerably decreased.

Further, the electric active stabilizer (31) may operate due to a disturbance, for example, produced when the vehicle wheels travel on an uneven road. In this case, the electric active stabilizer (31) may operate independently of a steering operation carried out by the driver. When the idling stop is ended independently of an operation of the driver, the driver is likely to feel a discomfort, compared with when the idling stop is ended (i.e., when the operation of the engine (25) is automatically restarted) by the operation of the driver. Thus, when the idling stop is ended while the electric active stabilizer (31) has been operated, the driver is likely to feel a discomfort. On the other hand, according to this aspect of the present invention, such a problem can be appropriately solved.

According to another aspect of the present invention, the electronic control unit (10) may be programmed to set the second threshold (SOC2) such that the second threshold (SOC2) set at a high vehicle speed is smaller than the second threshold (SOC2) at a low vehicle speed.

At the high vehicle speed, one operation time of the electric active stabilizer (31) tends to increase or an amount of an electric power consumed by one operation of the electric active stabilizer (31) tends to increase. According to this aspect of the present invention, when the vehicle speed (V) is high, the second threshold (SOC2) is set to a value smaller than the second threshold (SOC2) set when the vehicle speed (V) is low. Thus, there can be appropriately reduced a possibility that the starter (43) is operated while the electric active stabilizer (31) has been operated.

In the above description, for facilitating an understanding of the present invention, the elements of the present invention are accompanied with symbols along with parentheses used for corresponding elements of an embodiment. However, the elements of the present invention are not limited to the elements of the embodiment defined by the symbols.

BRIEF DESCRIPTION OF THE DRAWINGS

FIG. 12(*b*) is a view for illustrating a graph for showing a modified second threshold setting map.

DESCRIPTION OF THE PREFERRED EMBODIMENTS

Figure 1:
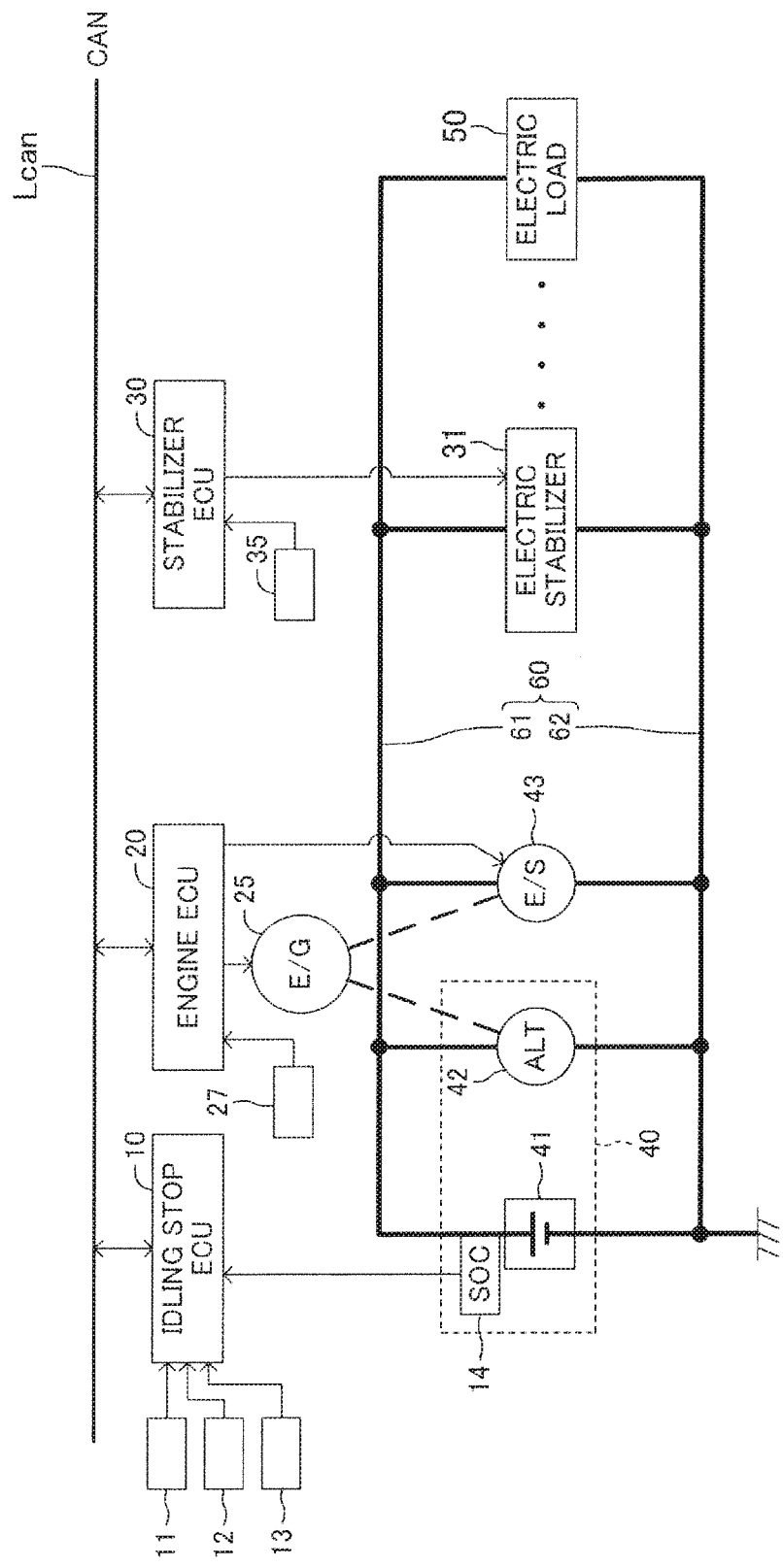
FIG. 1 is a view for illustrating a schematic configuration of a system for an idling stop control according to an embodiment of the present invention.

Below, with reference to the drawings, an idling stop control device according to an embodiment of the present invention will be described. FIG. 1 illustrates schematic configurations of an idling stop control device 10 and a system associated with the idling stop control device 10. A vehicle (e.g., a motor car) according to the present embodiment is a vehicle which travels by driving vehicle wheels by an engine (i.e., an internal combustion engine). The vehicle is not provided with the other electric driving source for the vehicle travelling such as an electric motor.

This vehicle includes the idling stop control device 10. The idling stop control device 10 (hereinafter, will be referred to as the idling stop ECU 10) according to the present embodiment is programmed to execute an idling stop control for automatically stopping an operation of an internal combustion engine 25 when an idling stop condition is satisfied while the vehicle has been stopped. In addition, the idling stop control ECU 10 is also programmed (or configured) to execute the idling stop control when the idling stop condition is satisfied even while the vehicle is travelling.

The idling stop ECU 10 is connected communicatively to an engine control device (hereinafter, will be referred to as the engine ECU) 20 and an active stabilizer control device (hereinafter, will be referred to as the stabilizer ECU) 30 via a communication line Lcan provided in a CAN (i.e., Controller Area Network). Thus, the idling stop ECU 10 is programmed (or configured) to send information to the ECUs 20 and 30 and receive information from the ECUs 20 and 30.

The engine ECU 20 is an electronic control unit provided with a microcomputer for controlling an output (or a torque and an engine speed) of the engine 25 as a main part. The engine ECU 20 is programmed (or configured) to receive detection signals output from various sensors 27 for an engine control and execute a fuel injection control, an ignition control, an intake air amount control and the like. Further, the engine ECU 20 is programmed (or configured) to receive an engine operation stop command and an engine restart command which are idling stop control commands, respectively sent from the idling stop ECU 10. In accordance with the engine operation stop command, the engine ECU 20 is programmed (or configured) to stop the operation of the engine 25 automatically. In accordance with the engine restart command, the engine ECU 20 is programmed (or configured) to restart the operation of the engine 25 automatically.

An alternator 42 is coupled to a crank shaft of the engine 25. The alternator 42 generates an electric power depending on a rotation of the crank shaft. The alternator 42 corresponds to an electric generator according to the present invention. The alternator 42 includes rectifiers (not illustrated) for converting the generated alternating current power to a direct current power. The alternator 42 outputs the direct current power rectified by the rectifiers. The electric power generated by and output from the alternator 42 is charged in a vehicle battery 41 and is used for operating vehicle electric loads 50.

The vehicle has a vehicle electric source 40 comprised of the vehicle battery 41 and the alternator 42 which are connected to each other in parallel. The vehicle battery 41 according to the present embodiment is a general lead battery which forms a 14V direct current power source. In this connection, the battery 41 may be the other type of battery.

Plus terminals of the battery 41 and the alternator 42 are connected to a plus-side line 61. Ground terminals of the battery 41 and the alternator 42 are connected to a ground-side line 62. The plus-side and ground-side lines 61 and 62 are provided in the vehicle to form a pair and together form an electric power supply line 60 to the electric loads 50 provided in the vehicle. Note that an electric power is supplied to various electronic control units (i.e., various ECUs) including the ECUs 10, 20 and 30 to operate the ECUs through the electric power supply line 60 although it is not illustrated in FIG. 1. An electric power source backup booster circuit not illustrated is provided in the electric power supply line 60 connected to the ECUs. Thus, the electric power supply line 60 is configured to supply an electric power of a stable voltage to each of the ECUs even when a voltage of the electric power supplied from the vehicle electric power source 40 drops temporarily.

An engine starter 43 is connected to the electric power supply line 60. The engine starter 43 is a starter motor for starting the operation of the engine 25 by an electric power supplied from the battery 41. The starter 43 is connected to the engine ECU 20. When the engine ECU 20 detects a manipulation of an engine starter switch (not illustrated) carried out by a driver under the state that the vehicle is stopped, the engine ECU 20 is programmed (or configured) to initiate the starter 43 to start the operation of the engine 25. In addition, the starter 43 is used for restarting the operation of the engine 25 while the engine 25 is under an idling stop state described later.

An electric active stabilizer (hereinafter, will be referred to as the electric stabilizer) 31 is provided in the vehicle. A drive of the electric stabilizer 31 is controlled by the stabilizer ECU 30. The stabilizer ECU 30 and the electric stabilizer 31 together configure an electric active stabilizer device. The electric active stabilizer device is known and for example, a device described in JP 2005-335504 A or the like may be used. Therefore, the electric active stabilizer device will be described briefly and if a detail of the electric active stabilizer device is needed, see documents such as JP 2005-335504 A.

Figure 2:
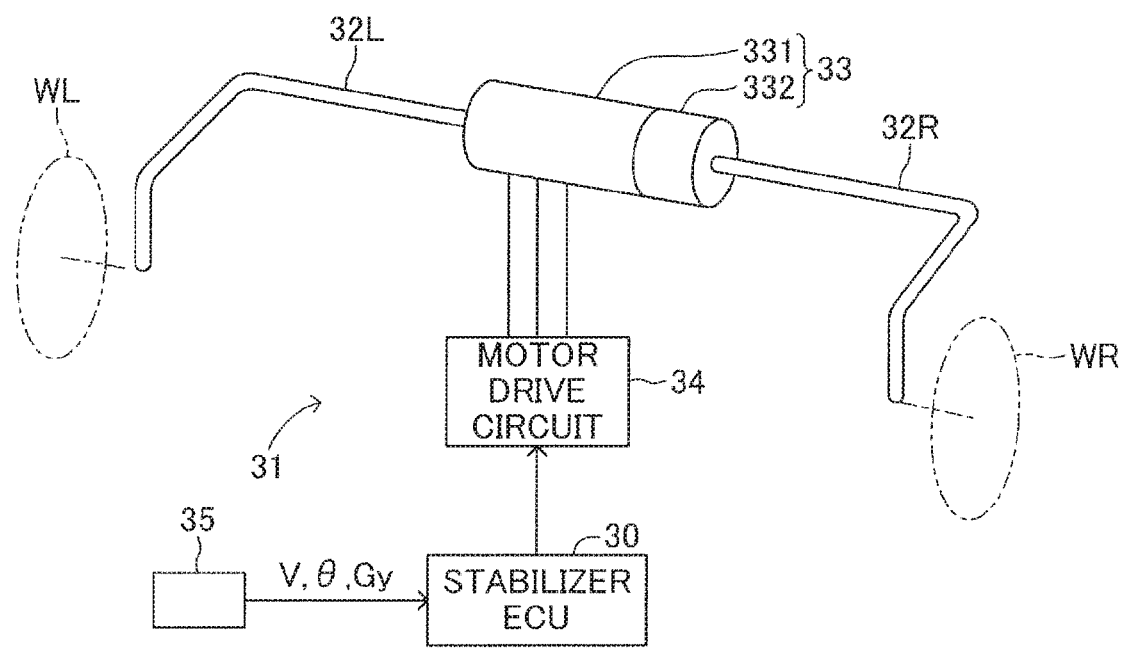
FIG. 2 is a view for illustrating a schematic configuration of an electric active stabilizer device.

As illustrated in FIG. 2, the electric stabilizer 31 is provided between the front wheels and/or between the rear wheels and serves to suppress a roll motion of a vehicle body. The electric stabilizer 31 includes a stabilizer bar 32, a motor unit 33 and a motor drive circuit 34. The stabilizer bar 32 includes right and left stabilizer bars 32R and 32L. One end of the left stabilizer bar 32L is coupled to an unsprung part of a left vehicle wheel WL. One end of the right stabilizer bar 32R is coupled to an unsprung part of a right vehicle wheel WR. The motor unit 33 includes an electric motor 331 and a reduction mechanism 332 which are interposed between the other end of the left stabilizer 32L and the other end of the right stabilizer 32R. The motor drive circuit 34 serves to drive the electric motor 331. The electric stabilizer 31 corresponds to an electric actuator according to the present invention.

The electric stabilizer 31 is configured to rotate the left stabilizer bar 32L in one direction about an axis of the left stabilizer bar 32L and to rotate the right stabilizer bar 32R in the other direction about an axis of the right stabilizer bar 32R to change a torsional stiffness of the stabilizer bar 32 formed by the left and right stabilizer bars 32L and 32R.

The stabilizer ECU 30 includes a microcomputer as a main part and is programmed (or configured) to drive the motor 331 of the electric stabilizer 31 to control the torsional stiffness of the stabilizer bar 32. The stabilizer ECU 30 is connected to roll control sensors 35 necessary for controlling a roll motion such as a vehicle speed sensor for detecting a vehicle speed V, a steering angle sensor for detecting a steering wheel angle θ and a lateral acceleration sensor for detecting a lateral acceleration Gy of the vehicle body. The stabilizer ECU 30 is programmed (or configured) to calculate a target roll angle on the basis of the detection values (for example, a vehicle speed V, a steering wheel angle θ and a lateral acceleration Gy) detected by the roll control sensor 35. Further, the stabilizer ECU 30 is programmed (or configured) to calculate a target motor torque of the motor 331 for achieving the target roll angle and set a target electric current depending on the calculated target motor torque.

The stabilizer ECU 30 is programmed (or configured) to control switching elements provided in the motor drive circuit 34 (for example, an inverter circuit or an H-bridge circuit) to cause the electric current corresponding to the target electric current to flow through the motor 331. The motor drive circuit 34 is connected to the electric power supply line 60 and causes the electric current corresponding to the target electric current to flow through the motor 331 from the vehicle electric power source 40. Thereby, the roll angle of the vehicle body can be controlled to the target roll angle.

Such a roll control is executed only when a lateral acceleration or yaw rate occurs in the vehicle body, that is, only when the vehicle is travelling.

Next, an idling stop control executed by the idling stop ECU 10 illustrated in FIG. 1 will be described. The idling stop ECU 10 includes a microcomputer as a main part. The idling stop ECU 10 is connected to a vehicle speed sensor 11, a brake sensor 12, an accelerator sensor 13 and an SOC sensor 14. The vehicle speed sensor 11 outputs a detection signal indicating a vehicle speed V.

The brake sensor 12 outputs a detection signal used for determining whether a brake pedal is operated or not. As the brake sensor 12, for example, there can be used a brake switch, a state of which is switched between ON and OFF states depending on whether or not the brake pedal is depressed or a brake position sensor for detecting a depression stroke of the brake pedal or a brake pressure sensor for detecting a brake fluid pressure of a master cylinder or the like. The accelerator sensor 13 outputs a detection signal used for determining whether or not an accelerator pedal is operated. As the accelerator sensor 13, for example, there can be used an accelerator position sensor for detecting a depression stroke of the accelerator pedal or the like. Note that the accelerator sensor 13 is used in a modified example described later.

The SOC sensor 14 outputs a present state of the battery 41 (i.e., State Of Charge), that is, an SOC value (%) which is an index indicating a magnitude of a remaining charged electric power amount of the battery 41. The SOC value can be expressed by a ratio (%) of the remaining charged electric power amount to a full charged electric power amount of the battery 41. For example, the SOC sensor 14 detects charged/discharged electric currents (i.e., charged and discharged electric current). A present SOC value is acquired by integrating the charged/discharged electric currents. The charged electric current corresponding to an electric current charged to the battery 41 is a positive value and the discharged electric current corresponding to an electric current discharged from the battery 41 is a negative value. In this case, the SOC sensor 14 may be simply an electric current sensor which outputs, to the idling stop ECU 10 with a predetermined period, a detection value of the charged/discharged electric current flowing through the battery 41 and the idling stop ECU 10 may be programmed (or configured) to acquire an SOC value through a process of integrating the charged/discharged electric currents.

Note that the SOC value is not limited to a value acquired on the basis of the charged/discharged electric current of the battery 41 and may be a value acquired on the basis of a terminal electric voltage of the battery 41 or an internal resistance of the battery 41 or the like. In this case, an accuracy SOC value can be acquired by correcting the SOC value on the basis of a temperature of the battery 41. Otherwise, the SOC value may be a value such as a minimum value of SOC values acquired by calculation methods, respectively or an average value of SOC values acquired by calculation methods. Hereinafter, an SOC value detected by the SOC sensor 14 will be referred to as the detected value SOCx.

Figure 3:
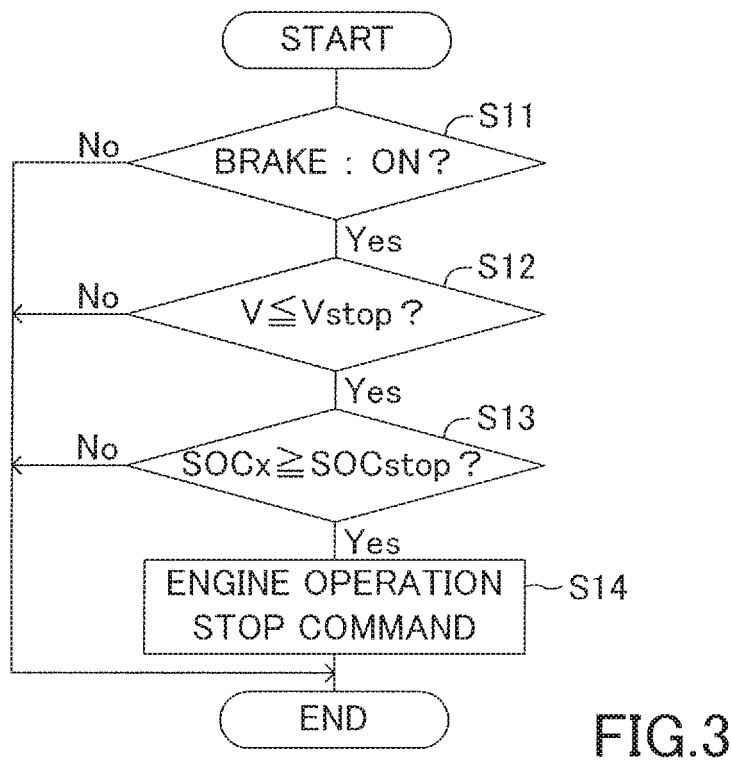
FIG. 3 is a view for illustrating a flowchart of an idling stop start control routine.

Now, a start condition for determining whether or not an idling stop should be started, will be described. FIG. 3 illustrates an idling stop start control routine executed by the idling stop ECU 10. The idling stop start control routine is executed with a predetermined short calculation period when the idling stop has not been started.

When the idling stop start control routine starts, the idling stop ECU 10 reads a detection signal output from the brake sensor 12 and determines whether or not the brake pedal is depressed at a step S11. When the brake pedal is not depressed, the idling stop ECU 10 determines "No" at the step S11 and ends the present execution of the routine once. The idling stop ECU 10 executes this routine repeatedly with the predetermined calculation period. When the operation of depressing the brake pedal is detected while the process described above is repeatedly executed, the idling stop ECU 10 determines "Yes" at the step 11 and proceeds with the process to a next step S12 to read a vehicle speed V detected by the vehicle speed sensor 11 and determine whether or not the detected vehicle speed V is equal to or smaller than a predetermined set vehicle speed Vstop. This predetermined set vehicle speed Vstop is one of the permission conditions for starting the idling stop and set as a vehicle speed (for example, 10 km/h) larger than the vehicle speed when the vehicle is stopped (i.e., 0 km/h) so as to start the idling stop when the vehicle speed of the vehicle decreases.

When the vehicle speed V exceeds the predetermined set vehicle speed Vstop, the idling stop ECU 10 determines "No" and ends the present execution of the routine once. When the idling stop ECU 10 detects the operation of the brake pedal and the vehicle speed V is equal to or smaller than the predetermined set vehicle speed Vstop while the idling stop ECU 10 repeatedly executes the processes described above, the idling stop ECU 10 determines "Yes" at the steps S12 and S13 and proceeds with the process to a next step 13 to read a detected value SOCx detected by the SOC sensor 14 and determine whether or not the present detected value SOCx is equal to or larger than a predetermined threshold SOCstop. This threshold SOCstop is one of the permission conditions for starting the idling stop.

When the detected value SOCx is smaller than the threshold SOCstop, the idling stop ECU 10 determines "No" at the step S13 and ends the present execution of this routine once. When the conditions of the steps S11, S12 and S13 are satisfied while the idling stop ECU 10 repeatedly executes the processes described above, the idling stop ECU 10 determines "Yes" at the steps S11, S12 and S13 and proceeds with the process to a next step S14 to output an engine operation stop command to the engine ECU 20. In other words, when the three conditions that (1) the brake pedal is operated, (2) the vehicle speed V is equal to or smaller than the predetermined set vehicle speed Vstop and (3) the detected value SOCx is equal to or larger than the threshold SOCstop are satisfied, the idling stop ECU 10 determines that the idling stop starting condition is satisfied and outputs an engine operation stop command. When the engine ECU 20 receives the engine operation stop command, the engine ECU 20 stops a fuel injection and an ignition of the fuel to stop the operation of the engine 25

As described above, the idling stop ECU 10 starts the idling stop when the vehicle speed V decreases to a vehicle speed equal to or smaller than the predetermined set vehicle speed V.

Figure 4:
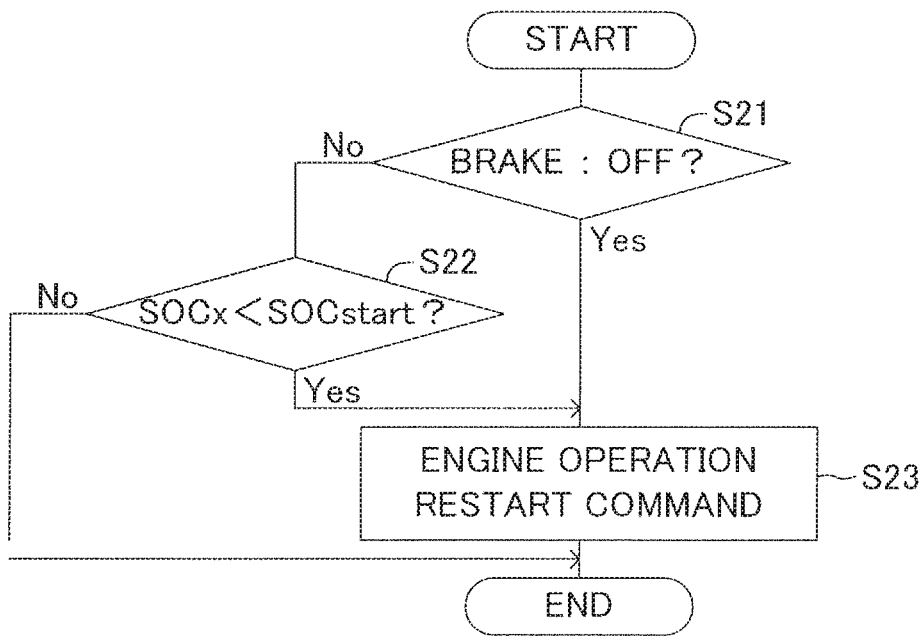
FIG. 4 is a view for illustrating a flowchart of an idling stop end control routine.

When the operation of the engine 25 is automatically stopped (i,e., when the idling stop is started) in this manner, the idling stop ECU 10 starts an idling stop end control routine illustrated in FIG. 4 in place of the idling stop start control routine. The idling stop ECU 10 repeatedly executes the idling stop end control routine with a predetermined short calculation period.

When the idling stop end control routine starts, the idling stop ECU 10 reads a detection signal output from the brake sensor 12 and determines whether or not the brake pedal is released at a step S21. When the brake pedal is not released, the idling stop ECU 10 determines "No" at the step S21 and proceeds with the process to a next step S22 to read an detected value SOCx detected by the SOC sensor 14 and determine whether or not the present detected value SOCx is smaller than a predetermined threshold SOCstart. This threshold SOCstart is one of conditions for prohibiting the idling stop and is set to a value smaller than the threshold SOCstop.

The idling stop ECU 10 repeatedly executes the determinations of the steps S21 and S22. Then, when any of the conditions of the steps S21 and S22 is satisfied, the idling stop ECU 10 determines "Yes" at the step S21 or S22 and proceeds with the process to a next step S23 to output an engine operation restart command to the engine ECU 20. In other words, when any of two conditions that (1) the brake pedal is released and (2) the detected value SOCx is smaller than the threshold SOCstart is satisfied, the idling ECU 10 determines that the idling stop end condition is satisfied and outputs an engine operation restart command. When the engine ECU 20 receives the engine operation restart command, the engine ECU 20 activates the starter 43 to restart the operation of the engine 25. Thereby, the idling stop is ended. Note that the condition (1) may be replaced with a condition that the brake pedal is released and the accelerator pedal is depressed.

While the operation of the engine 25 has been stopped by the idling stop control, the alternator 42 does not generate an electric power and thus, only the battery 41 of the vehicle power source 40 can be used. Thus, when the electric stabilizer 31 is activated while the idling stop has been carried out, an electric power is supplied from the battery 41 to the electric stabilizer 31. An amount of the electric power consumed by the electric stabilizer 31 is large and thus, the rate that the SOC value of the battery 41 decreases when the electric stabilizer 31 is operated is larger than the rate that the SCO value of the battery 41 decreases when the electric stabilizer 31 is not operated.

In this case, when the detected value SOCx is smaller than the threshold SOCstart which is one of the conditions for prohibiting the idling stop, the starter 43 is activated to restart the operation of the engine 25 by the idling stop end control routine. When the starter 43 is activated while the electric stabilizer 31 has been operated, a stable supply of the electric power to the electric stabilizer 31 is not carried out and thus, the roll motion state of the vehicle body may change in an undesirable manner.

Figure 5:
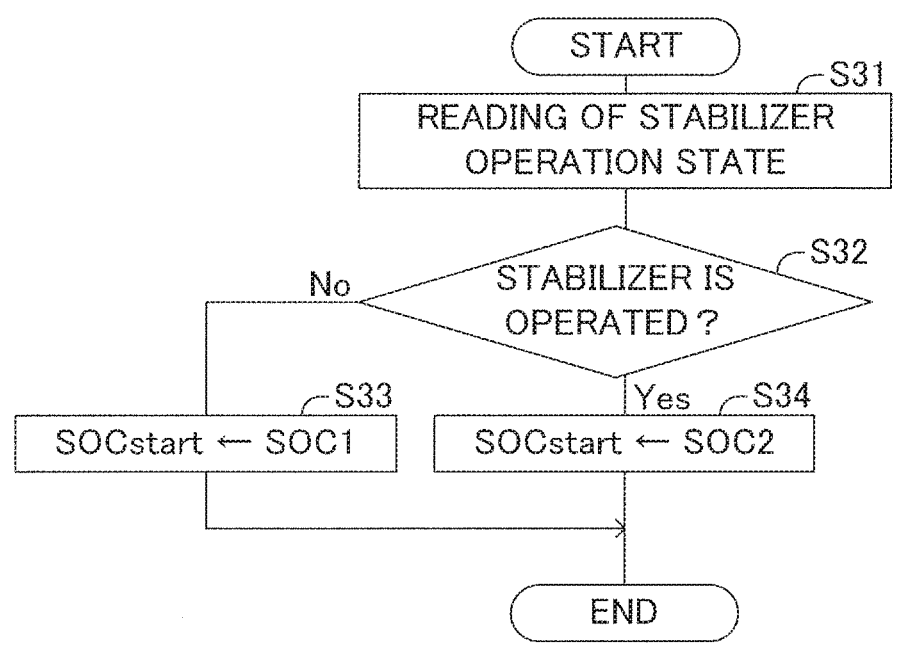
FIG. 5 is a view for illustrating an SOC threshold switching control routine.

Accordingly, the idling stop ECU 10 is programmed (or configured) to execute a process for prohibiting the restart of the operation of the engine 25 by the idling stop control while the electric stabilizer 31 has been operated as possible. FIG. 5 illustrates an SOC threshold switching control routine executed by the idling stop ECU 10. The SOC threshold switching control routine is repeatedly executed with a predetermined short calculation period while the idling stop has been carried out (i.e., while the operation of the engine 25 has been automatically stopped by the idling stop control).

When the SOC threshold switching control routine starts, the idling stop ECU 10 reads information on an operation state of the electric stabilizer 31 from the stabilizer ECU 30 at a step S31. When the stabilizer ECU 30 drives the electric stabilizer 31, the stabilizer ECU 30 is programmed (or configured) to send an operation signal to the communication line Lcan of the CAN. On the other hand, when the stabilizer ECU 30 does not drive the electric stabilizer 31, the stabilizer ECU 30 is programmed (or configured) to send a non-operation signal to the communication line Lcan. The idling stop ECU 10 is programmed (or configured) to read the operation or non-operation signal sent to the communication line Lcan.

Next, at a step S32, the idling stop ECU 10 determines whether or not the electric stabilizer 31 has been operated. When the electric stabilizer 31 has not been operated, the idling stop ECU 10 determines "No" at the step S32 and proceeds with the process to a next step S33 to set a first threshold SOC1 to the threshold SOCstart which is one of the conditions of prohibiting the idling stop. On the other hand, when the electric stabilizer 31 has been operated, the idling stop ECU 10 determines "Yes" at the step S34 and proceeds with the process to a next step S34 to set a second threshold SOC2 to the threshold SOCstart. The second threshold SOC2 is smaller than the first threshold SOC1.

After the idling stop ECU 10 sets the threshold SOCstart at the step S33 or S34, the idling stop ECU 10 ends this execution of the routine once. The idling stop ECU 10 repeatedly executes this routine with the predetermined calculation period.

Figure 6:
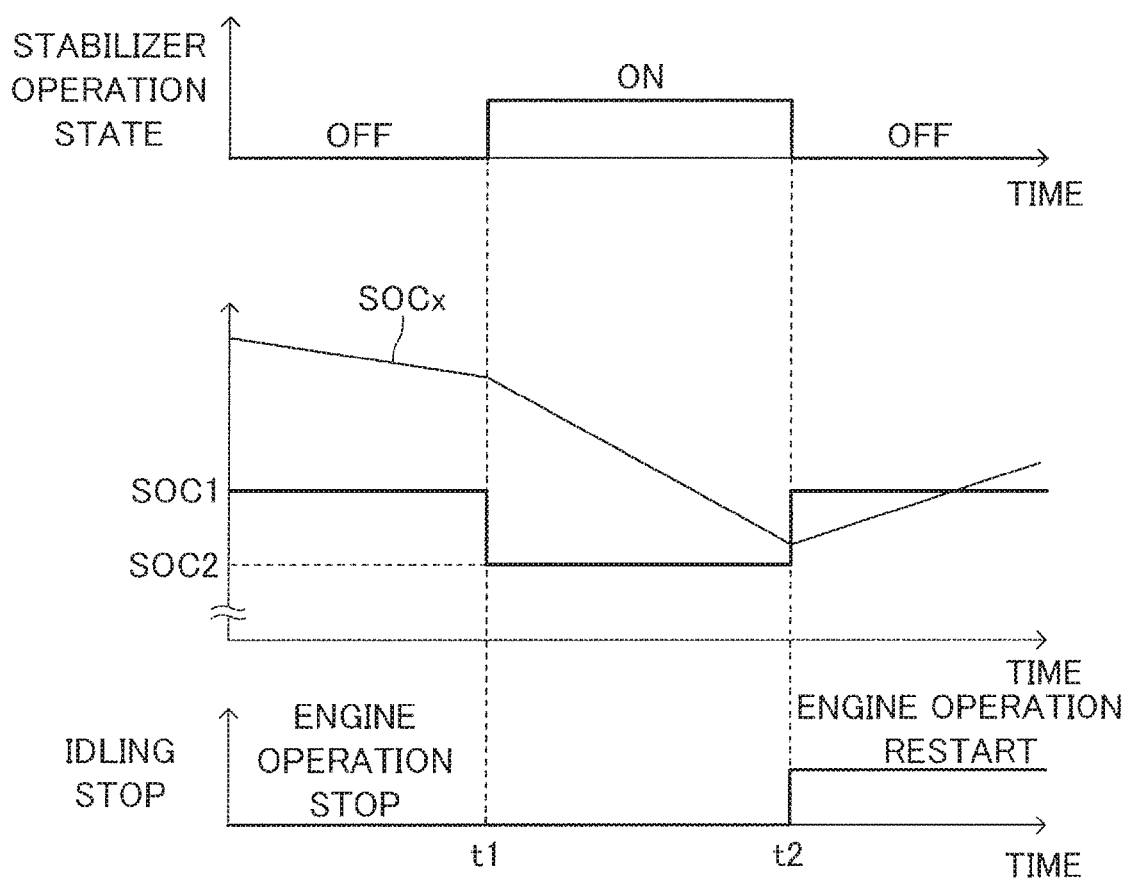
FIG. 6 is a view for illustrating a timing chart for showing an operation of a stabilizer and a switching timing of an SOC threshold.

FIG. 6 illustrates a timing chart showing a switching timing of the threshold SOCstart. The alternator 42 does not generate an electric power while the idling stop has been carried out (i.e., while the automatic stop of the operation of the engine 25 has been carried out) and thus, the detected value SOCx corresponding to the SOC value of the battery 41 decreases due to a supply of an electric power from the battery 41 to the various electric loads 50. When the operation of the electric stabilizer 31 is started at a time t1, the rate of the decrease of the detected value SOCx becomes large.

At the same time as the start of the operation of the electric stabilizer 31, the threshold SOCstart is changed from the first threshold SOC1 to the second threshold SOC2 (see the time t1) and at the same time as the end of the operation of the electric stabilizer 31, the threshold SOCstart is returned to the first threshold SOC1 from the second threshold SOC2 (see a time t2). The operation of the electric stabilizer 31 is ended due to the end of the turning movement of the vehicle body and thus, normally, the operation of the electric stabilizer 31 may not continue for a long time. Therefore, while the electric stabilizer 31 has been operated, the detected value SOCx may decrease to a value smaller than the first threshold SOC1, however, may not decrease to the second threshold SOC2. Thus, the operation of the engine 25 has been stopped until the operation of the electric stabilizer 31 is ended at the time t2. In addition, when the operation of the electric stabilizer 31 is ended, the threshold SOCstart is returned to the first threshold SOC1 from the second threshold SOC2 and thus, the detected value SOCx becomes smaller than the threshold SOCstart. Therefore, the operation of the engine 25 is restarted. Further, one operation time of the electric stabilizer 31 is short and thus, the second threshold SOC2 can be set as a value for suppressing the significant decrease of the remaining charged electric power amount of the battery 41.

Therefore, according to the present embodiment, it is possible to reduce a possibility that the starter 43 is activated while the electric stabilizer 31 has been operated. Thereby, it is possible to reduce a possibility that the roll motion state changes in an undesirable manner while the roll motion control has been executed by the stabilizer ECU 30. Therefore, an occurrence of an uncomfortable feeling in the driver can be suppressed as possible. Further, when the detected value SOCx becomes smaller than the second threshold SOC2 while the electric stabilizer 31 has been operated, the starter 43 is activated and thus, the further decrease of the SOC value of the battery 41 can be suppressed. Therefore, the operation of the engine 25 can be restarted.

Further, the electric stabilizer 31 may operate due to a disturbance when the vehicle wheels travel on uneven road. In this case, the electric stabilizer 31 operates independently of the steering operation carried out by the driver. The driver is likely to feel a discomfort when the idling stop is ended independently of the operation carried out by the driver, compared with when the idling stop is ended due to the operation carried out by the driver (i.e., when the operation of the engine 25 is automatically restarted). Thus, when the idling stop is ended while the electric stabilizer 31 has been operated, the driver is likely to feel a discomfort. On the other hand, according to the present embodiment, such a problem can be appropriately solved.

Figure 11:
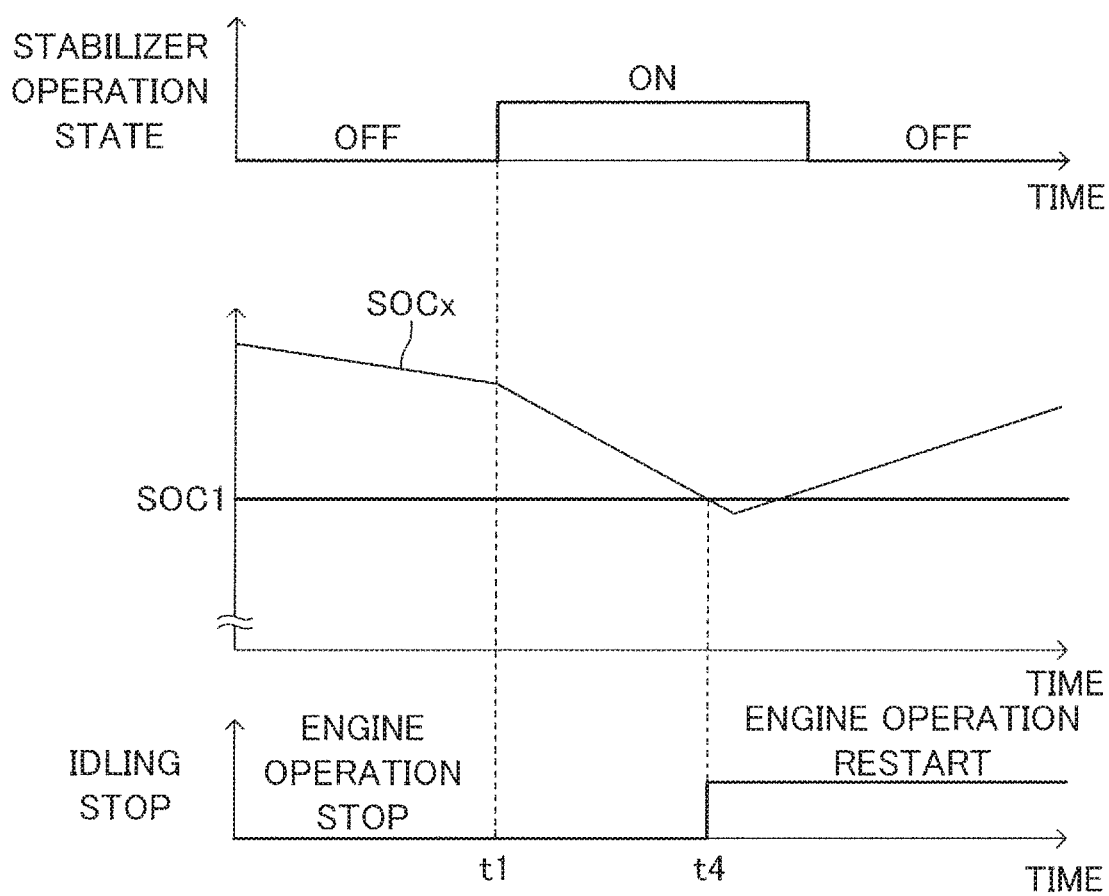
FIG. 11 is a view for illustrating a timing chart for showing an operation of a stabilizer and a switching timing of an SOC threshold according to a comparative example.

FIG. 11 illustrates a timing chart of a comparative example which the threshold SOCstart is not changed. In an idling stop control device according to this comparative example, the threshold SOCstart is fixed to the first threshold SOC1. Therefore, when the detected value SOCx becomes smaller than the first threshold SOC1 at a time t4 while the electric stabilizer 31 has been operated, the operation of the engine 25 is restarted, that is, the starter 43 is activated. Thus, while the roll motion control has bee executed, the amount of the electric power supplied to the electric stabilizer 31 changes and thus, the roll motion state changes in an undesirable manner.

<Modified example of SOC threshold switching control routine>

Now, a modified example of the SOC threshold switching control routine will be described. The SOC threshold switching control routine according to the embodiment described above (see FIG. 5) is configured to maintain the threshold SOCstart at the second threshold SOC2 while the electric stabilizer 31 has been operated. On the other hand, the SOC threshold switching control routine according to the modified example is configured to maintain the threshold SOCstart at the second threshold SOC2 for a constant time from the start of the operation of the electric stabilizer 31.

Figure 7:
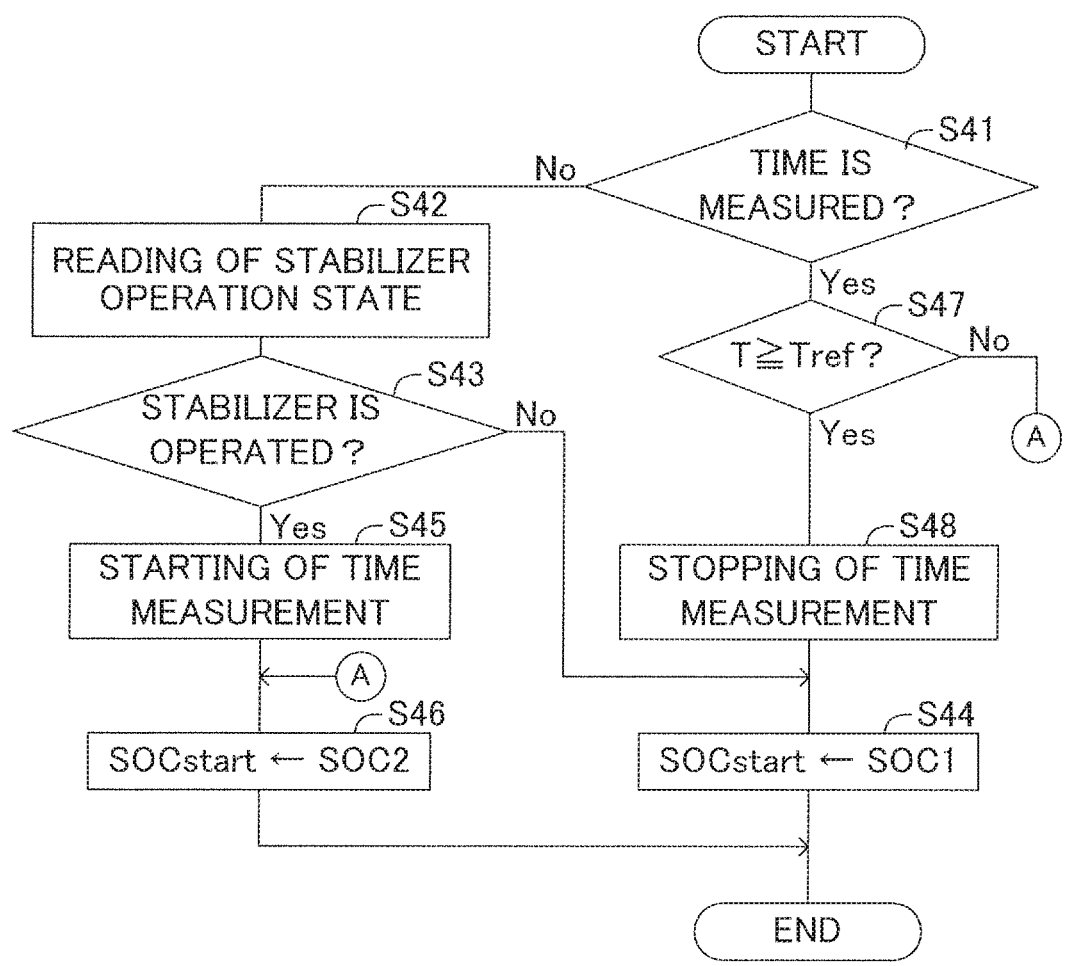
FIG. 7 is a view for illustrating a flowchart of an SOC threshold switching control routine according to a modified example.

FIG. 7 illustrates the SOC threshold switching control routine according to the modified example executed by the idling stop ECU 10. This SOC threshold switching control routine is repeatedly executed with a predetermined short calculation period while the idling stop has been carried out (i.e., while the operation of the engine 25 has been automatically stopped by the idling stop control).

When the SOC threshold switching control routine starts, the idling stop ECU 10 determines whether or not a time has been measured by a timer at a step S41. The idling stop ECU 10 is programmed (or configured) to measure a time when the threshold SOCstart has been set to the second threshold SOC2 as described later by a timer. The idling stop ECU 10 determines whether or not the time has operated at the step S41. The timer has not operated when the SOC threshold switching control routine starts. Thus, the idling stop ECU 10 determines "No" at the step S41 and proceeds with the process to a next step S42 to read information on the operation state of the electric stabilizer 31.

Next, at a step S43, the idling stop ECU 10 determines whether or not the electric stabilizer 31 has been operated. When the electric stabilizer 31 has not been operated, the idling stop ECU 10 determines "No" at the step S43 and proceeds with the process to a next step S44 to set the threshold SOCstart to the first threshold SOC1. On the other hand, when the electric stabilizer 31 has been operated, the idling stop ECU 10 determines "Yes" at the step S43 and proceeds with the process to a next step S45 to start a measurement by the timer. Then, at a next step S46, the idling stop ECU 10 sets the threshold SOCstart to the second threshold SOC2. The first and second thresholds SOC1 and SOC2 are the same as the first and second thresholds SOC1 and SOC2 of the embodiment described above, respectively.

After the idling stop ECU 10 sets the threshold SOCstart at the step S44 or S46, the idling stop ECU 10 ends this execution of this routine once. The idling stop ECU 10 repeatedly executes this routine with the predetermined calculation period.

When the operation of the electric stabilizer 31 is started while the idling stop has been carried out, the threshold SOCstart is set to the second threshold SOC2 and the measurement of the timer is started. In this case, the idling stop ECU 10 determines "Yes" at the step S41 and proceeds with the process to a next step S47. At the step S47, the idling stop ECU 10 determines whether or not a timer value T corresponding to the time measured by the timer reaches a threshold Tref corresponding to a predetermined constant time. The timer value T is cleared to zero before the operation of the electric stabilizer 31 is started. When the timer value T does not reach the threshold Tref, the idling stop ECU 10 determines "No" at the step S47 and proceeds with the process to the step S46 to maintain the threshold SOCstart at the second threshold SOC2.

After the idling stop ECU 10 starts the measurement by the timer, the idling stop ECU 10 determines whether or not the timer value T reaches the threshold Tref at the step S47 independently of the operation state of the electric stabilizer 31. When the timer value T reaches the threshold Tref, the idling stop ECU 10 determines "Yes" at the step S47 and proceeds with the process to a next step S48 to stop the measurement by the timer and then, proceeds with the process to the step S44 to return the threshold SOCstart to the first threshold SOC1 from the second threshold SOC2.

After the idling stop ECU 10 returns the threshold SOCstart to the first threshold SOC1 from the second threshold SOC2, the idling stop ECU 10 ends this execution of the SOC threshold switching control routine. In other words, during the this time idling stop, the idling stop ECU 10 ends the SOC threshold switching control routine at this time and thereafter, does not repeatedly execute the SOC threshold switching control routine. When the idling stop is ended and thereafter, the idling stop is again started, the idling stop ECU 10 clears the timer value T to zero and restarts the SOC threshold switching control routine.

Figure 8:
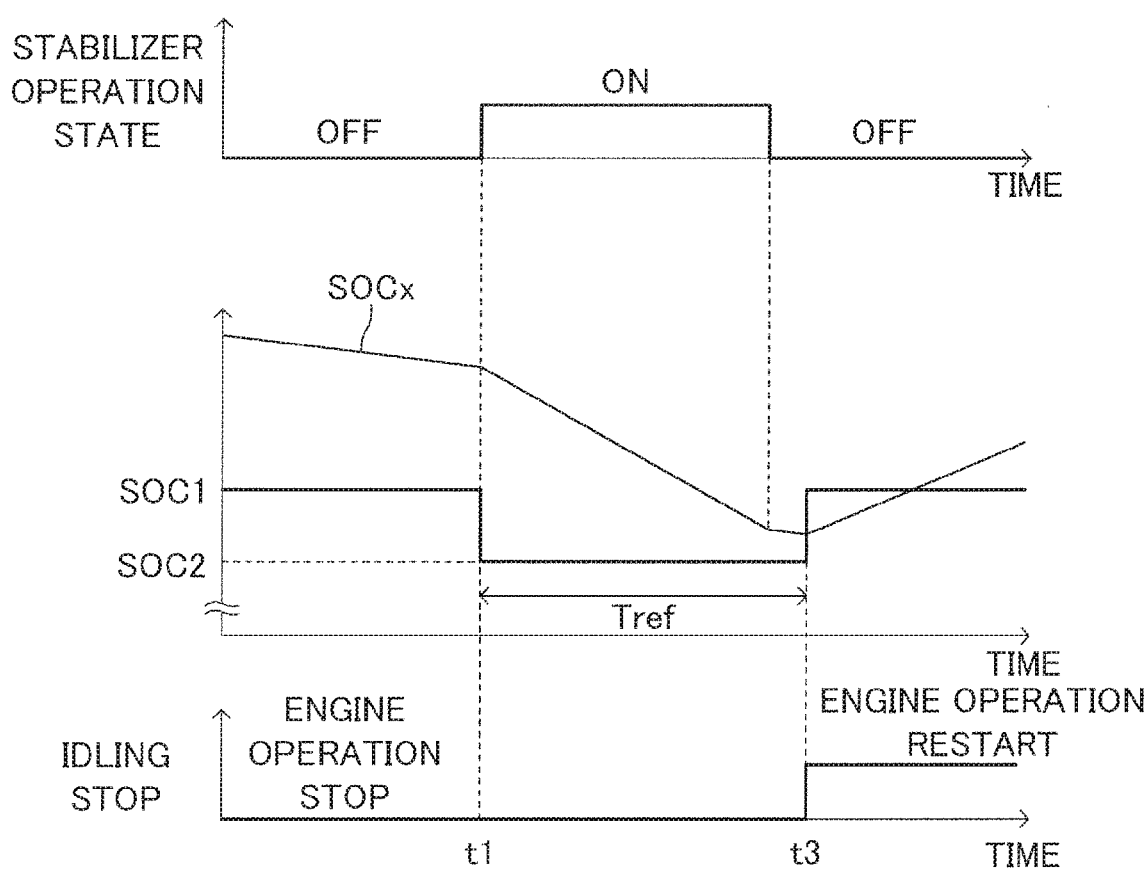
FIG. 8 is a view for illustrating a timing chart for showing an operation of a stabilizer and a switching timing of an SOC threshold according to the modified example.

FIG. 8 illustrates a timing chart showing a switching timing of the threshold SOCstart carried out by the SOC threshold switching control routine according to the modified example. In this example, the measurement by the timer is started from a time t1 when the threshold SOCstart is changed from the first threshold SOC1 to the second threshold SOC2. Then, when the timer value T reaches the threshold Tref at a time t3, the threshold SOCstart is returned to the first threshold SOC1. The operation of the electric stabilizer 31 is ended when the turning movement of the vehicle body ends and thus, normally, the operation of the electric stabilizer 31 has not continued for a long time. Therefore, during the normal operation, the threshold SOCstart is not returned to the first threshold SOC1 by setting the threshold Tref on the basis of an expected one operation time of the electric stabilizer 31.

As a result, according to the modified example, similar to the embodiment, it is possible to reduce a possibility that the starter 43 is activated while the electric stabilizer 31 has been operated. Thereby, it is possible to reduce a possibility that the roll motion state changes in an undesirable manner while the roll motion control has been executed by the stabilizer ECU 30. Therefore, it is possible to suppress that the driver feels a discomfort as possible. Further, when the threshold SOCstart becomes smaller than the second threshold SOC2 before the operation time of the electric stabilizer 31 reaches the threshold Tref, the starter 43 is activated. Therefore, a further decrease of the SOC value of the battery 41 can be prevented and thus, the operation of the engine 25 can be restarted.

<Modified example of start and end conditions of idling stop>

Now, a modified example relating to a setting of start and end conditions of the idling stop will be described. The embodiment described above is configured to start the idling stop while the vehicle has been decelerated by the operation of the brake pedal. On the other hand, this modified example is configured to start the idling stop when the driver releases the accelerator.

Figure 9:
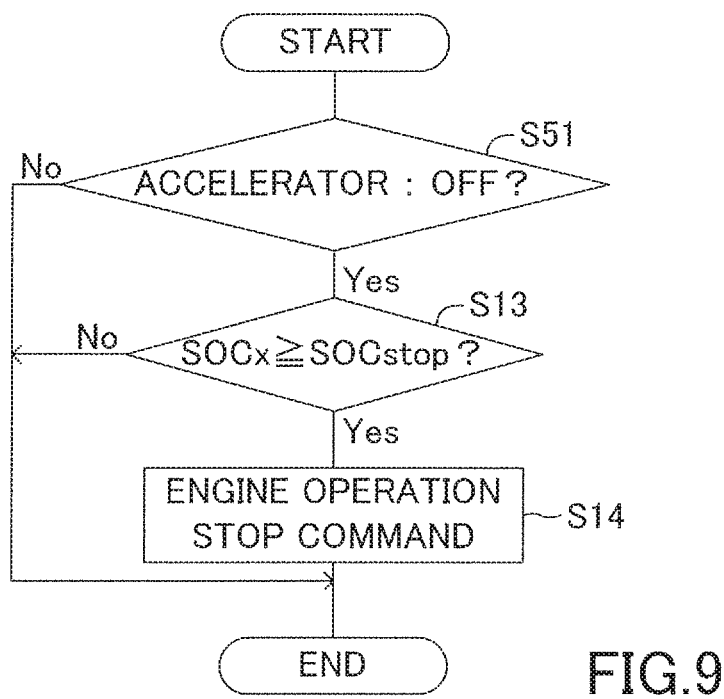
FIG. 9 is a view for illustrating a flowchart of an idling stop start control routine according to the modified example.

FIG. 9 illustrates an idling stop start control routine according to the modified example executed by the idling stop ECU 10. This idling stop start control routine according to the modified example includes a process of a step S51 in place of the steps S11 and S12 of the idling stop start control routine according to the embodiment. The other processes of the idling stop start control routine according to the modified example are the same as the corresponding processes of the idling stop start control routine according to the embodiment, respectively. Here, the process which is different from the process according to the embodiment will be described and the description of the processes which are the same as the processes according to the embodiment described above will be omitted. The processes according to the modified example which are the same as the processes according to the embodiment described above are accompanied with the same step symbols as those of the embodiment, will be omitted.

In this idling stop start control routine according to the modified example, the idling stop ECU 10 reads a detection signal output from the accelerator sensor 13 and determines whether or not the accelerator pedal has been operated at a step S51. When the accelerator pedal has not been operated, the idling stop ECU 10 determines "Yes" and proceeds with the process to the step S13.

Therefore, according to the idling stop start control routine of this modified example, when the driver releases the accelerator pedal while the vehicle is travelling and the detected value SOCx becomes equal to or larger than the threshold SOCstop, the idling stop (i.e., the automatic stop of the operation of the engine 25) is started. Therefore, the fuel can be saved and the amount of the exhaust gas can be reduced.

Figure 10:
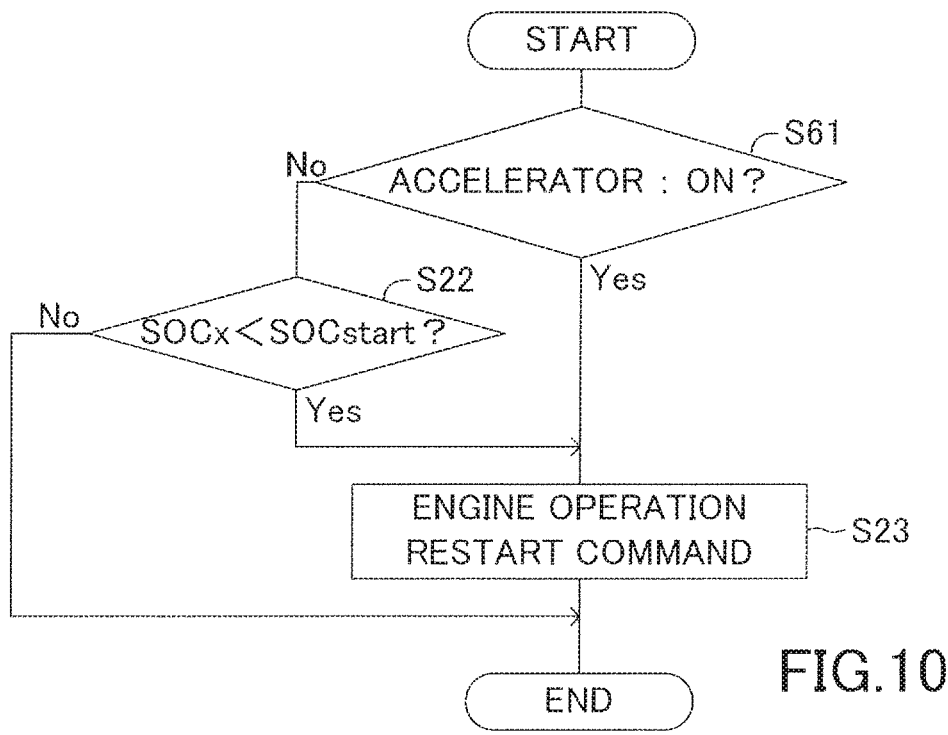
FIG. 10 is a view for illustrating a flowchart of an idling stop end control routine according to the modified example.

The condition for ending the idling stop is set on the basis of the accelerator pedal operation. FIG. 10 illustrates an idling stop end control according to a modified example executed by the idling stop ECU 10. This idling stop end control routine according to the modified example includes a step S61 in place of the step S21 of the idling stop end control routine according to the embodiment described above. The other processes of this idling stop end control routine according to the modified example are the same as the corresponding processes of the idling stop end control routine according to the embodiment described above, respectively.

In this idling stop end control routine according to the modified example, the idling stop ECU 10 reads a detection signal output from the accelerator sensor 13 and determines whether or not the accelerator pedal has been operated at the step S61. When the accelerator pedal has not been operated, the idling stop ECU 10 determines "No" ad proceeds with the process to the step S22. On the other hand, when the accelerator pedal has been operated, the idling stop ECU 10 determines "Yes" and proceeds with the process to the step S23.

Therefore, according to the idling stop end control routine of this modified example, when the driver depresses the accelerator pedal while the idling stop has been carried out or when the SOCx becomes smaller than the threshold SOCstart while the idling stop has been carried out, the idling stop is ended. Thus, the idling stop can be appropriately ended.

According to this modified example, a frequency of the execution of the idling stop while the vehicle is travelling is large and as a result, a frequency of the operation of the electric stabilizer 31 while the idling stop has been carried out is large. Therefore, the switching of the threshold SOCstart by the SOC threshold switching control routine (see FIG. 5) is considerably effective.

The idling stop control device according to the embodiment of the present invention has been described. However, the present invention is not limited to the embodiment. Various modifications can be employed without departing from the object of the present invention.

For example, according to the present embodiment, changed on the basis of the operation state of the electric stabilizer 31 is the threshold (i.e., the threshold SOCstart) of the detected value SOCx which is one of parameters for defining the condition for ending the idling stop (i.e., the condition for restarting the operation of the engine 25). However, the threshold may be changed on the basis of at least one of operation states of the other electric actuators. For example, there can be used operation states of electric actuators for changing the motion state of the vehicle while the vehicle is travelling such as an electromagnetic active suspension device or an electric power steering device.

For example, the electromagnetic active suspension device includes electric motors in respective shock absorbers, respectively and generates damping forces by a regenerative control of the electric motors and driving forces by supplying electric power from the vehicle electric power source to power-running-control the electric motors. In order to generate the driving forces in the shock absorbers by power-running-controlling the electric motors, a large amount of the electric power is needed. Thus, the use of the electromagnetic active suspension device as the electric actuator according to the present invention is considerably effective.

Further, the electric power steering device includes an electric motor on a steering shaft or a steering rack and generates a steering assist torque by the electric motor in accordance with a steering operation force carried out by the driver. In particular, in order to generate the steering assist torque while the vehicle is travelling at an extremely low vehicle speed, a large amount of the electric power is needed. Thus, the use of the electric power steering device as the electric actuator according to the present invention is considerably effective.

Further, the present embodiment is configured to send the engine restart command from the idling stop ECU 10 to the engine ECU 20 to cause the engine ECU 20 to drive the starter 43. However, in place of this, there can be employed a configuration to output a drive signal directly from the idling stop ECU 10 to the starter 43.

Figure 12A:
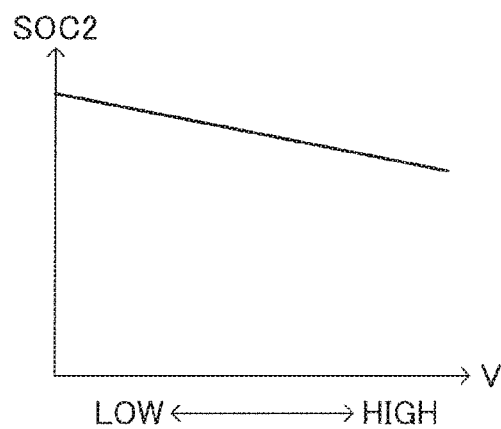
FIG. 12(*a*) is a view for illustrating a graph for showing a second threshold setting map.
Figure 12B:
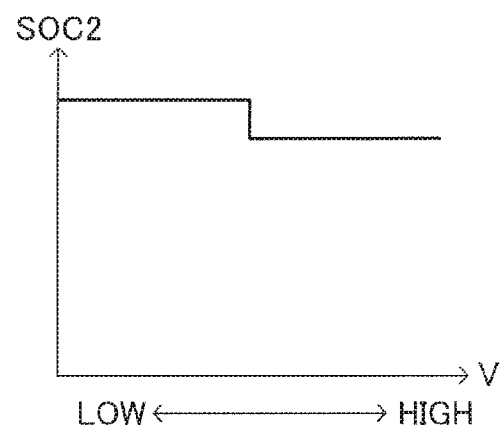

Further, according to the embodiment described above, the first and second thresholds SOC1 and SOC2 are set to constant values, respectively. However, there can be employed a configuration for changing at least one of the first and second thresholds SOC1 and SOC2. For example, there can be employed a configuration for changing the second threshold SOC2 depending on the vehicle speed V such that the second threshold SOC2 set when the vehicle speed V is high is smaller than the second threshold SOC2 set when the vehicle speed V is low. For example, the idling stop ECU 10 stores a second threshold setting map illustrated in FIG. 12(*a*) or 12(*b*) and sets the second threshold SOC2 depending on the vehicle speed V with reference to this second threshold setting map. According to the second threshold setting map illustrated in FIG. 12(*a*), the set second threshold SOC2 gradually decreases as the vehicle speed V increases. According to the second threshold setting map illustrated in FIG. 12(*b*), the set second threshold SOC2 decreases in a step-by-step manner as the vehicle speed V increases. In this case, for example, the second threshold SOC2 is set on the basis of the vehicle speed V when the threshold SOCstart is changed from the first threshold SOC1 to the second threshold SOC2. Otherwise, the second threshold SOC2 may be set depending on the vehicle speed V in accordance with the change of the vehicle speed V.

When the vehicle is travelling at a high vehicle speed, a time of one operation of the electric stabilizer 31 tends to increase or an amount of the electric power consumed by one operation of the electric stabilizer 31 tends to increase. Thus, it is appropriately possible to reduce a possibility that the starter 43 is activated while the electric stabilizer 31 has been operated by setting the second threshold SOC2 to a value smaller than the second threshold SOC2 set while the vehicle is travelling at a low vehicle speed. In particular, this is effective since a frequency of the operation of the electric stabilizer 31 while the idling stop has been carried out is high in a system for starting the idling stop when the accelerator pedal is released as in the modified example illustrated in FIGS. 9 and 10. Further, for example, in the modified example illustrated in FIG. 8, when the vehicle speed V is high, the threshold Tref may be set to a time longer than a threshold Tref set when the vehicle speed V is low.

What is claimed is:

1. An idling stop control device for a vehicle, comprising:
an internal combustion engine;
a vehicle electric power source having a generator for generating an electric power by an output of the engine and a battery charged by the generator;
a starter for starting an operation of the engine by an electric power supplied from the battery; and
an electric actuator for changing a motion state of the vehicle by an electric power supplied from the vehicle electric power source while the vehicle is travelling,
the idling stop control device comprising an electronic control unit programmed to execute an idling stop control for automatically stopping and restarting the operation of the engine on the basis of a predetermined idling stop condition while the vehicle is travelling,
wherein the electronic control unit is programmed:
to acquire a remaining charged electric power amount index indicating a magnitude of a remaining charged electric power amount of the battery;
to restart the operation of the engine by operating the starter when the remaining charged electric power amount index becomes smaller than a predetermined restart threshold while the automatic stop of the operation of the engine has been carried out by the idling stop control; and
to change the restart threshold from a first threshold to a second threshold when the operation of the electric actuator is started while the automatic stop of the operation of the engine has been carried out by the idling stop control, the first threshold being a threshold set immediately before the operation of the electric actuator is started and the second threshold being smaller than the first threshold.

2. The idling stop control device as set forth in claim 1, wherein the electronic control unit is programmed to return the restart threshold from the second threshold to the first threshold when the operation of the electric actuator is ended after the restart threshold is changed to the second threshold.

3. The idling stop control device as set forth in claim 1, wherein the electronic control unit is programmed:
to maintain the restart threshold at the second threshold until a predetermined constant time elapses after the restart threshold is changed to the second threshold; and
to return the restart threshold to the first threshold when the predetermined constant time elapses.

4. The idling stop control device as set forth in claim 1, wherein the electric actuator is an electric active stabilizer for changing a torsional stiffness of a stabilizer bar by driving an electric motor.

5. The idling stop control device as set forth in claim 4, wherein the electronic control unit is programmed to set the second threshold such that the second threshold set at a high vehicle speed is smaller than the second threshold set at a low vehicle speed.

* * * * *